United States Patent

[11] 3,587,100

[72] Inventors William Doremus
Sparta;
Edgar J. Evans, Parsippany, both of, N.J.;
Jan H. Helbers, Rochester, Mich.

[21] Appl. No. 753,002
[22] Filed Aug. 15, 1968
[45] Patented June 22, 1971
[73] Assignee Said Doremus, and said Evans, by said Helbers

[54] SIGNAL TRANSMISSION AND RECEIVING SYSTEM
11 Claims, 17 Drawing Figs.

[52] U.S. Cl. .................... 343/225, 46/244, 273/86, 318/16
[51] Int. Cl. .................... A63h 30/04, H04b 7/00
[50] Field of Search .................... 46/244; 273/86, 86.2; 104/60, 149; 246/28, 187; 35/11; 340/171; 318/16; 343/225, 228, 719

[56] References Cited

UNITED STATES PATENTS

| | | | |
|---|---|---|---|
| 3,205,618 | 9/1965 | Heytow | 46/244 |
| 3,263,141 | 7/1966 | Nicola | 340/171 X |
| 3,270,199 | 8/1966 | Smith | 340/171 X |
| 3,400,488 | 9/1968 | Phillpott et al. | 46/244 |
| 3,427,732 | 2/1969 | Wopart, Jr. | 35/11 X |
| 3,470,474 | 9/1969 | Rohrer | 343/719 X |

*Primary Examiner*—John W. Caldwell
*Assistant Examiner*—Scott F. Partridge
*Attorney*—Popper, Bain and Bobis

ABSTRACT: A signal transmission system including means to modulate a carrier in accordance with signals, modulated carrier transmission means, means to multiplex a plurality of carriers, means to selectively receive and demodulate a chosen carrier to provide the signals, and means to select for utilization only predetermined ones of said signals.

WILLIAM DOREMUS
EDGAR J. EVANS
JAN H. HELBERS
INVENTORS

BY Popper Bain + Bobis
Attys

WILLIAM DOREMUS
EDGAR J. EVANS
JAN H. HELBERS
INVENTORS
BY Popper Bain & Bobis
Attys

WILLIAM DOREMUS
EDGAR J. EVANS
JAN H. HELBERS
INVENTORS

BY Popper Bain + Bobis
Attys

WILLIAM DOREMUS
EDGAR J. EVANS
JAN H. HELBERS
INVENTORS

BY Pepper Baint Bobis
Attys

WILLIAM DOREMUS
EDGAR J. EVANS
JAN H. HELBERS
INVENTORS

BY Popper Bain & Bobis
Attys

SIGNAL TRANSMISSION AND RECEIVING SYSTEM

BACKGROUND OF THE INVENTION

This invention relates to a new and improved signal transmission and receiving system and, more particularly, to a pulse modulated control signal transmitting and receiving system for selectively and proportionately controlling, through the use of each frequency of a plurality of carrier frequencies, a large plurality of independent control functions.

By and large it may be understood that the number of available carrier frequencies for signal transmission is fast becoming exhausted and that the number of signals, or amount of information which can be effectively transmitted and received or any given carrier frequency, assuming one to be available, is band-pass limited. Thus, although relatively large number of signals, or amounts of information, may be effectively transmitted on a given carrier frequency, there is a practical limit in accordance with currently employed transmission and reception techniques.

In addition, and of equal importance here, is the fact that although it is possible to provide for the transmission of a large number of signals, in the nature of control signals, on a single carrier frequency, and to selectively have a large number of control signal receiving means to effectively receive the same, this in itself is insufficient to provide for satisfactory system control in instances wherein only certain of the said control signals are intended to be effective for only certain of said receiving means. This is to say that, if for example, six receiving means are to effectively receive control signals from transmitting means on the same carrier frequency, there is no problem. If, on the other hand certain only, of said control signals are to be effective for certain, only, of said six control signal receiving means despite the fact that all control signals are received by all receiving means, it may be readily understood that a significant problem arises, and especially in instances wherein control signal formulation, transmission, reception and desired response times do not permit the use of a simple transmitting and receiving means "on-off" type code.

Further, in instances wherein a plurality of control system, each comprising control signal transmission and receiving means may be operated in close proximity to each other to decided commercial advantage, as for example in the indoor operation of a plurality of model racing car tracks, each of which includes a large plurality of model racing cars operable thereon and is controlled by an independent control system, and each of which control systems operates on the same carrier frequency or plurality thereof, it may be understood that the problem of "crosstalk" or control signal interference between these closely disposed control systems, with resultant failure in the operation thereof, cannot be lightly dismissed.

SUMMARY OF INVENTION

As disclosed herein, the system of our invention is directed to the independent and proportional control of large pluralities of model racing cars, and comprises model car control signal formulation and transmitting means which are effective for each of a specified group of said model racing cars, to pulse code modulate a carrier frequency with a plurality of control signals and transmit the same. In addition, to increase the number of control functions available, the system has been designed to employ several carrier frequencies multiplexed on the same transmission means. Control signal receiving and decoding means are incorporated in each of the said model racing cars and are tuned, in each of the model racing cars of a said specified group, to receive and decode only those control signals transmitted on the pulse modulated carrier frequency associated therewith. Control signal selection means are provided in each of the said receiving and decoding means and are operable to select and render effective only those decoded control signals which are intended for the particular model racing car in which the same are disposed. In one embodiment of the system, means are provided to precisely confine the effective range of the transmitted control signals within a predetermined area whereby a plurality of the systems of our invention may be satisfactorily operated in close proximity to each other without control signal "crosstalk" or interference.

OBJECTS OF THE INVENTION

It is, accordingly, an object of this invention to provide a new and improved signal transmission and receiving system which enables the transmission of a large number of control signals, or amount of information through the pulse code modulation of each frequency of a plurality of carrier frequencies, and the effective reception of certain, only, of these control signals by certain, only, of a plurality of receiving means which are tuned to receive the same.

Another object of this invention is the provision of a system as above wherein the control signal formulation means are continuously variable throughout the entire effective range thereof and the control signal function to be performed upon effective reception of a control signal is proportionately and continuously variable in accordance therewith.

Another object of this invention is to provide, in one disclosed embodiment thereof, means for precisely confirming the effective range of the transmitted signals to a predetermined, relatively small area whereby a plurality of the systems of the invention can be satisfactorily operated in relatively close proximity to each other without control signal "crosstalk" or interference.

Another object of the invention is the provision of a system as above which requires the use of only relatively uncomplicated and readily available components of proven dependability whereby the costs of fabrication and operation thereof are maintained at low levels, and long periods of satisfactory, maintenance-free operation thereof assured.

Another object of the invention is the provision of a control system as above which is particularly, though by no means exclusively, adapted to the control of hobby items such as toys in the nature of model racing cars.

The above and other objects of this invention are believed made clear by the following detailed description thereof taken in conjunction with the accompanying drawings wherein.

Figure 1:
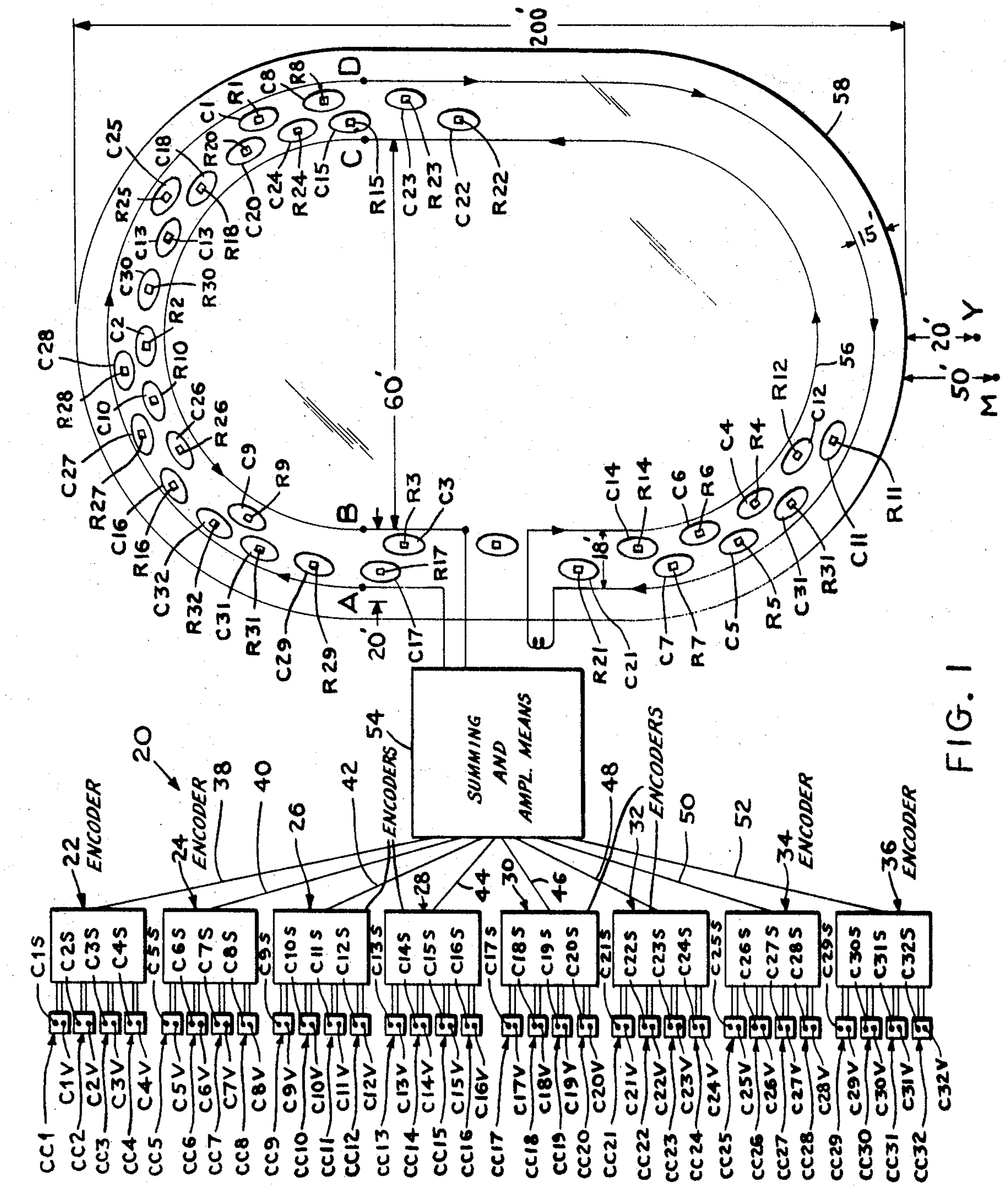
FIG. 1 is a general block diagram of the system of the invention, including control signal encoding, transmission, receiving and decoding means, and illustrating the application thereof to the control of a plurality of model racing cars within a confined area, model car track.

Referring now to the general system block diagram of FIG. 1, the system transmitter means are indicated generally at 20 and may be seen to comprise a plurality of control signal formulation or encoding means as indicated at 22, 24, 26, 28, 30, 32, 34, and 36, respectively, each of which is operatively connected, as indicated by control lines 38, 40, 42, 44, 46, 48, 50, and 52, respectively, to control signal summation and amplification means as indicated at 54. A loop-type antenna is indicated at 56 and connects as shown with the control signal summation and amplification means 54. The loop antenna is imbedded in or otherwise positioned below, above, or on the surface of a model car racing track 58 of similar external configuration. A plurality of model racing cars, in this instance 32, identified as C1 through C32 are disposed on the surface of the model racing car track 58 for obvious purpose, and each of the said model racing cars includes therein control signal receiving and decoding means as indicated by R1 through R32, respectively.

Referring again to the control signal formulation or encoding means 22 through 36, respectively, each of the same may be seen to include four car control consoles connected thereto by appropriate control lines. Thus, for example, control signal formulation or encoding means 22 may be seen to include car control consoles, CC1 through CC4 connected thereto; control signal formulation or encoding means 28 may be seen to include car control consoles CC13, CC14, CC15 and CC16 connected thereto; while control signal formulation or encoding means 36 may be seen to include car control consoles, CC29, CC30, CC31 and CC32 connected thereto. Each of the said car control consoles may in turn be seen to include two proportionally variable, rotatable or other wise manipulatable model car controllers. Thus, for example, car control console CC1 will include car controllers C1S and C1V, car control console CC13 will include car controllers C13S and C13V, car control console CC25 will include car controllers C25S and C25V, and car control console CC32 will include car controllers C32S and C32V.

Briefly described for purposes of introductory description it may be noted that the ultimate function of the system as depicted in FIG. 1 is to enable the remote control of the operation of the model racing cars C1 through C32 on the surface of the model car racing track 58, it being noted here that the surface of the latter is completely devoid of any model racing car guide means in the nature of tracks or guide rails as are normally found on model racing car tracks of this nature. More specifically, and insofar as the operation of the system of FIG. 1 is concerned, both the steering and velocity of each of the said model racing cars is remotely controllable through manual actuation of the correspondingly numbered car controllers. Thus, for example, the steering of car C1 is remotely controllable through the manual actuation of car controller C1S or car control console CC1, while the velocity of car C1 is similarly remotely controllable through manual actuation of the car controller C1V of the said car control console. In like manner, the steering and velocity of car C17 are remotely and independently controllable through manual actuation of the car controllers C17S and C17V included in the car control console CC17, while the steering and velocity of car C29 are remotely and independently controllable through manual actuation of the car controllers C29S and C29V of car control console CC29.

It is, at this juncture, to be emphasized that each control function is completely proportional that is to say it may be varied continuously in level or degree. This, the proportional response of the steering and velocity of each car will be directly related to its relevant, continuously variable car controller such as to allow a response from one extreme to the other and to be selectable at any point intermediate the extremes.

The performance of these car steering and velocity control functions is accomplished in each instance by the formulation or encoding of an appropriate control signal within the relevant control signal formulation or encoding means, the amplification of the thusly formulated control signal within the control signal summation and amplification means 54, the transmission of the thusly formulated and amplified control signal from the loop-type antenna 56, the selective reception of the thusly transmitted control signal by the control signal receiving and decoding means carried by the model racing car for which the said control signal is intended, and the subsequent decoding and transduction of the said control signal into a usable form of energy within the said model racing car to control the steering and velocity thereof. This is to say that the respective model racing car control signal receiving and decoding means, R1 through R32 are each tuned to receive, decode and transduce only those control signals intended therefore, whereby it becomes possible to substantially simultaneously transmit 64 control signals while receiving and utilizing, in each model racing car control signal receiving and decoding means, only the two control signals specifically intended therefore. Thus, for example, although all of the control signals are transmitted substantially simultaneously from the loop-type antenna 56, it may be understood that only those control signals formulated or encoded by the manipulation of car controls C1S and C1V will be received and utilized by the control signal receiving and decoding means R1 in model racing car C1 to control the steering and velocity of the latter. In like manner, only those control signals formulated or encoded through manipulation of car controllers C23S and C23V will be received and utilized by the control signal receiving and decoding means R23 of model racing car C23 to control the steering and velocity of the latter.

Figure 2:
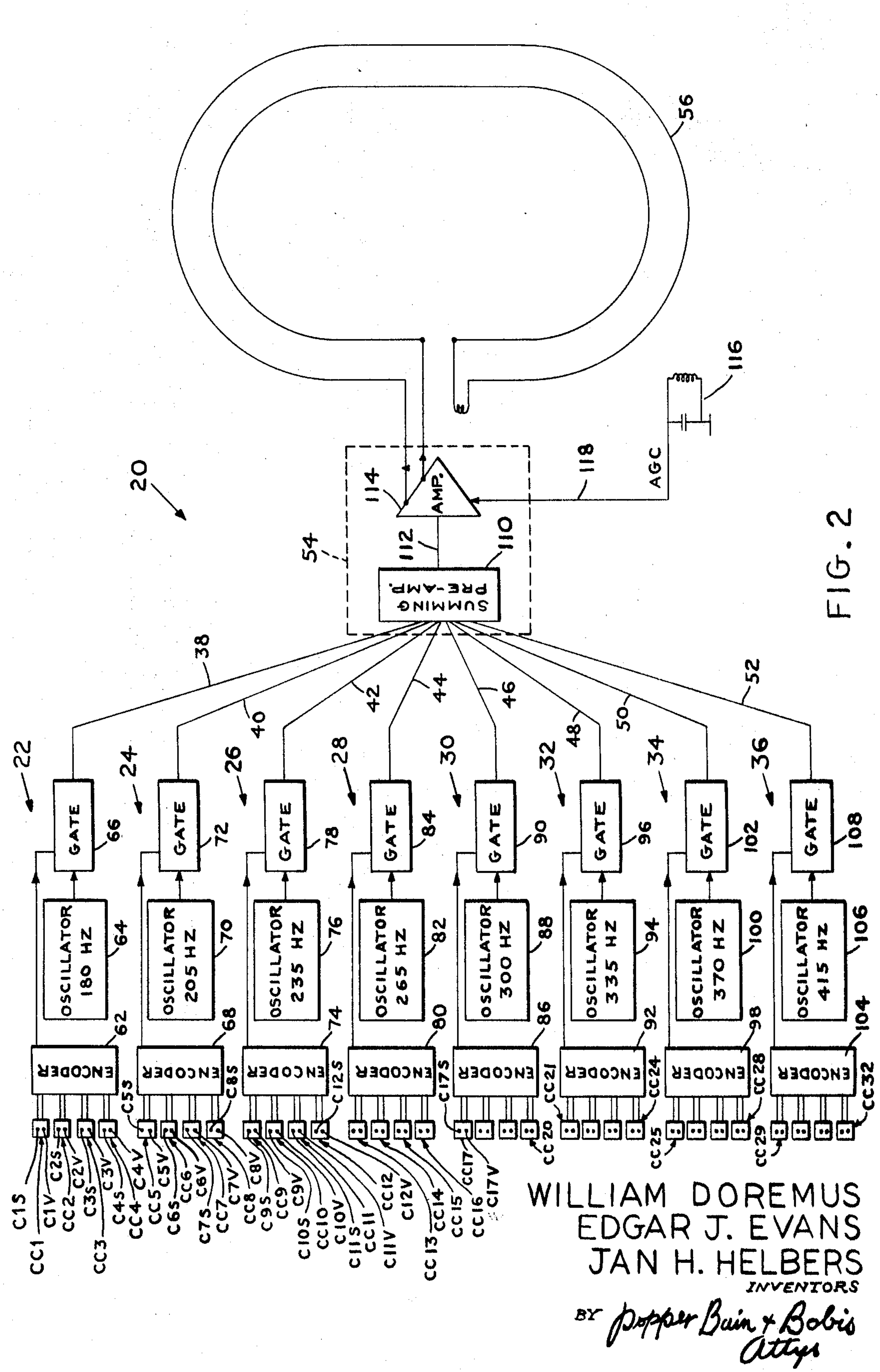
FIG. 2 is a block diagram illustrating the control signal encoding and transmission means of the system of FIG. 1 in greater detail.

Referring now to the more detailed showing in FIG. 2 of the system transmitter means 20 of FIG. 1, it may be seen that each of the control signal formulation or encoding means 22 through 36 comprises an encoder and an oscillator connected as indicated to provide the two inputs to a gate to thus provide for "gating" of the oscillator. Thus, for example, control signal formulation or encoding means 22 includes an encoder 62 and a carrier frequency oscillator 64 connected as shown to provide the two inputs to gate 66, while control signal formulation or encoding means 26 comprises encoder 74 and carrier frequency oscillator 76 connected as indicated to provide the inputs to gate 78, and control signal formulation or encoding means 28 comprise encoder 74 and carrier frequency oscillator 76 connected as indicated to the inputs of gate 78. In like manner, control signal formulation or encoding means 30 comprise encoder 86 and carrier frequency oscillator 88 connected as indicated to the inputs of gate 90, while control signal formulation or encoding means 36 comprise encoder 104 and carrier frequency oscillator 106 connected as indicated to the inputs of gate 108.

The outputs of the respective gates are transmitted, as indicated by the control lines 38 through 52, to the control signal summation and preamplification means 110, and the output from the latter is transmitted, as indicated by control line 112, to the amplifier 114. Field strength monitoring means 116 are provided for purposes described in detail hereinbelow and are cooperatively associated, as indicated by control line 118, with the amplifier 114, as are automatic gain control means indicated as AGC in FIG. 2 of the drawings.

The respective carrier frequency oscillators are each, of course, preset to provide a substantially constant carrier frequency at the respective outputs thereof. As disclosed herein, oscillator 64 is preset to provide a carrier frequency of 180 kH3., oscillator 70 is preset to provide a carrier frequency of 205 kHz., oscillator 76 is preset to provide a carrier frequency of 235 kHz. oscillator 82 is preset to provide a carrier frequency of 265 kHz. oscillator 88 is preset to provide a carrier frequency of 300 kHz. oscillator 94 is preset to provide a carrier frequency of 335 kHz. oscillator 100 is preset to provide a carrier frequency of 370 kHz., and oscillator 106 is preset to provide a carrier frequency of 415 kHz., it being here emphasized, however, that in each instance, these frequencies are intended as representative only of those frequencies within an available frequency range which may be provided and that other and different carrier frequencies may be provided by the respective oscillator means with the primary consideration being the provision of the largest possible carrier frequency differences within the said available frequency range. In the herein disclosed embodiment of our invention, it may be noted that the specified oscillator carrier frequencies were determined primarily by the design and selectivity of the respective model racing car receivers R1 through R32 as discussed in further details hereinbelow.

Figure 3:
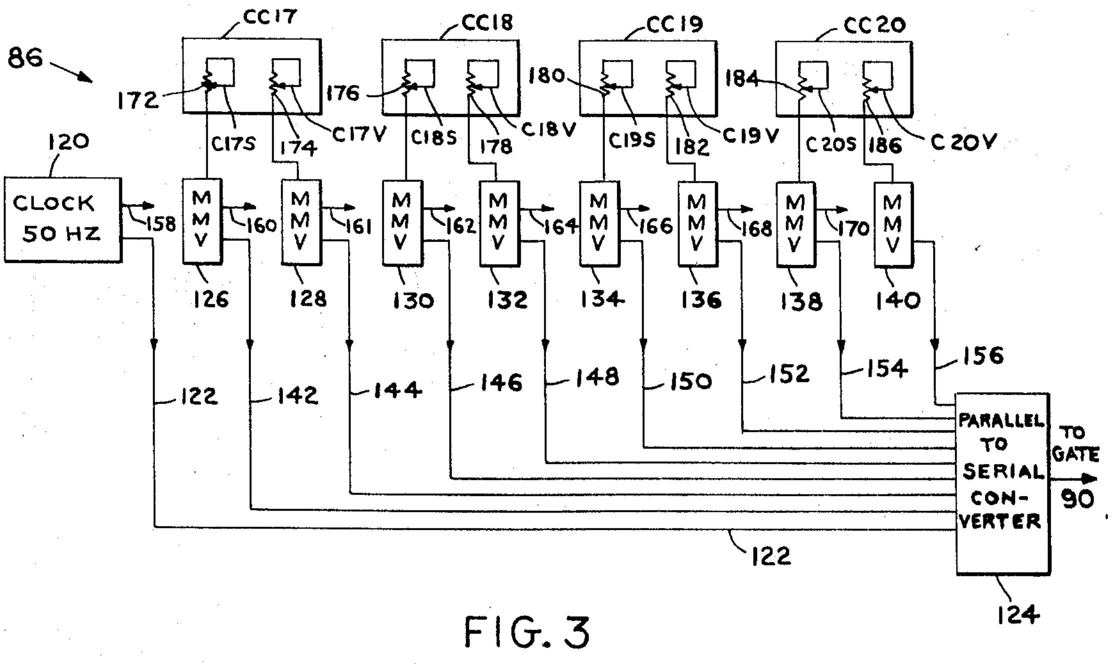
FIG. 3 is a block diagram illustrating one of the control signal encoding means of FIG. 2 in greater detail.

One of the encoders of FIG. 2, in this instance encoder 86, is depicted in greater detail in FIG. 3 and may be seen to comprise 50 Hz. clock means 120 connected as indicated by line 122 to parallel to serial converter means 124. Eight monostable multivibrators, or "one shot" multivibrators, are designated MZ on FIG. 3 and indicated at 126, 128, 130, 132, 134, 136, 138 and 140, respectively, and are connected, as indicated by lines 142, 144, 146, 148, 150, 152, 154 and 156 to the parallel to serial converter means 124.

A line 158 functions to transmit the 50 Hz. output of the clock means 120 as a trigger input to monostable multivibrator 126 while a line 160 functions to transmit the output from the monostable multivibrator 126 as a trigger input to the monostable vibrator 128. In like manner, line 161 transmits the output of the monostable multivibrator 128 as a trigger input to the monostable multivibrator 130; a line 162 transmits the output of the monostable multivibrator 130 as a trigger input to monostable multivibrator 132; a line 164 transmits the output of the monostable multivibrator 132 as a trigger input to the monostable multivibrator 134; a line 166 transmits the output of the monostable multivibrator 134 as a trigger input to monostable multivibrator 136; a line 168 transmits the output of the monostable multivibrator 136 as a trigger input to the monostable multivibrator 138; and a line 170 transmits the output of the monostable multivibrator 138 as a trigger input to the monostable multivibrator 140.

Briefly described, although well known in the art, a monostable multivibrator is in essence a timing device which has one permanently stable state, and when in this state, functions to provide a zero output indicative thereof as its stable output. However, the application of a trigger input to the monostable multivibrator effects a temporary state change therein to a temporarily stable state to result in the provision therefrom of a nonzero output for a period of time determined by the time constant of the monostable multivibrator circuit. At the expiration of this time period, the monostable multivibrator automatically returns to its permanently stable state with the result that a zero output is again provided therefrom. Thus, the application of a trigger input to a monostable multivibrator of the nature utilized herein will result in providing a pulse therefrom as a nonzero output, the duration of which will be dependent upon the time constant of the monostable multivibrator circuit and readily variable therewith.

To this effect, and with regard to encoder 86 as seen in FIG. 3, the monostable multivibrator 126 includes as a circuit element thereof a variable resistance 172 disposed as shown in car controller console CC17 and variable, as indicated by manipulation of car controller C17S, and this resistance variation is to be understood to be effective to vary the time constant of the circuit of monostable multivibrator 126 to in turn vary the duration of the pulse which will be provided as the nonzero output thereof on line 142 following the application of a trigger input or triggering signal thereto. In like manner, monostable multivibrator 128 includes as a circuit element thereof a variable resistance 174 which is disposed as shown in car controller console CC17 and is operative, when varied by manipulation of car controller C17V, to vary the duration of the pulse provided as a nonzero output on line 144 by this monostable multivibrator. Similarly, monostable multivibrators 130 and 132 respectively include variable resistances 176 and 178 at circuit elements thereof and these resistances are disposed as shown within car controller console CC18 and variable through manipulation of car controllers C18S and C18V respectively. In like manner, variable resistances 180, 182, 184 and 186 are disposed as shown in car controller consoles CC19 and CC20 and are effective, upon variation in the respective resistance values thereof produced by manipulation of car controllers C19S and C19V and C20S and C20V, to control the nonzero output pulse durations of monostable multivibrators 134, 136, 138 and 140. Thus, the disposition of the respective variable resistances 172 through 186 in the respective car controller consoles CC17 through CC20, and the provision for variation in the respective resistance values of the former through manipulation of the respective car controllers C17S and C17V through C20s and C20V, makes possible the selective control of the respective duration of pulses emitted by the monostable multivibrators 126 through 140 as nonzero outputs upon the triggering thereof by trigger inputs as described above.

As utilized herein, the respective monostable multivibrators 126 through 140 are each configured with the capability to provide nonzero output pulses ranging in duration from 0.5 msec. to 1.5 msec. depending, of course, on the resistance values set into the respective variable resistances 172 through 186 by the respective car controllers C17S through C20S and C17V through C20V, respectively.

In operation, and with each of the respective monostable multivibrators set by its connected car controller to provide a nonzero output pulse of duration ranging from 0.5 msec. to 1.5 msec., and the information framing frequency being determined by the rate of clock means 120 to be 50 cycles per second to thus result in each information frame being 20 msec., the next generated pulse from the clock means 120 will function on line 158 as a trigger input to monostable multivibrator 126 to thereby trigger the latter to switch to the temporarily stable state thereof, and provide a nonzero output pulse on line 142 to the parallel to serial converter means 124. At the end of this temporarily stable state or timing period for monostable multivibrator 126, the duration of which is determined by the setting of car controller C17S, the said multivibrator will switch back to the stable state thereof to provide an output on line 160 to multivibrator 128. This output will function on line 160 as a trigger input to trigger monostable multivibrator 128 to in turn switch to its temporarily stable state. At the end of this temporarily stable state, the duration of which is determined by the setting of car controller C17V, the monostable multivibrator 128 will switch back to the stable state thereof and simultaneously provide an output on line 161. This output will function to trigger monostable multivibrator 130 to in turn switch to the temporarily stable state thereof. This process continues in time cascade with each of the monostable multivibrators functioning in turn to provide a set output pulse or information bit, of predetermined duration as discussed in detail hereinabove.

Concomitantly, the parallel to serial converter means 124 will function, upon the receipt of the clock pulse on line 122 and upon receipt of the above-described pulses on lines 142, 144, 146, 148, 150, 152, 154 and 156, respectively said pulses occurring simultaneously with returning of each monostable multivibrator to the stable state thereof to furnish information which is representative of the time duration of each monostable multivibrator output so generated in time cascade. This is to say that subsequent to the initiation pulse, from clock 120 via line 122, each of the monostable multivibrators in turn furnishes a pulse to the parallel to serial converter means 124 as the said multivibrator returns to the permanently stable state thereof. The parallel to serial converter means 124 will thus function in the manner of a monostable multivibrator in that, upon receipt of a pulse, the same will emit an output pulse on line 90 of approximately 200 $\mu$sec.

Figure 4:
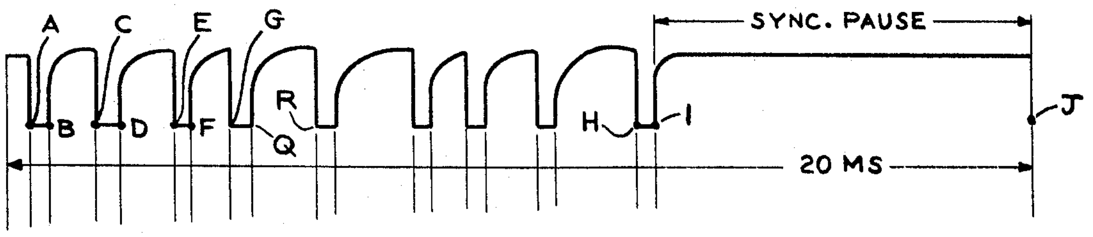
FIG. 4 illustrates a control signal waveform as might be provided by the control signal encoding means of FIG. 3.

This functioning of the parallel to serial converter means 124 is believed clearly illustrated by the waveform of FIG. 4 which is intended to illustrate the output therefrom for one cycle or information frame under typical variable resistance settings as would occur during the use of the system of our invention to control a model car race. More specifically, point A on the wave form of FIG. 4 indicates the commencement thereof in time when the trigger input to monostable multivibrator 126 on line 158 commences the provision of its output pulse or information bit. Point A also indicated the commencement of the output to gate 90 from the parallel to serial converter 124 resulting from the concurrent input on line 122, and this output to gate 90 is of approximately 200 μsec. duration and corresponds to A—B.

When monostable multivibrator 126 has completed its timing period and returns to its permanently stable state at point C, the output from monostable vibrator 126 has caused monostable multivibrator 128 to commence the provision of its output pulse or information bit by means of output from line 160 and simultaneously triggers converter 124 by means of line 142. Simultaneously, at Point C, the output on line 90 of parallel to serial converter means 124 will occur for approximately 200 μsec. as indicated at C—D.

The timing period of monostable multivibrator 128 is completed at Point E and causes monostable multivibrator 130 to commence the provision of its output pulse or information bit, to be completed at Point G. Simultaneously, however, at Point E, an output E—F of approximately 200 μsec. will commence to be provided from parallel to serial converter means 124 on line 90. This continues in time cascade, as discussed hereinabove, until Point H at which point all of the monostable multivibrators have been triggered, provided their respective output pulses as information bits, and returned to the respective permanently stable states thereof, whereupon the parallel to serial converter means output wave form returns to its normal level after generating pulse H—I and thence providing a relatively long synchronization pulse or pause I—J for use in synchronizing the operation of the respective model car receiver and decoding means as described in detail hereinbelow.

Of primary significance here is the fact that the respective durations of the time intervals of FIG. 4 correspond directly to the durations of the respective output pulses or information bits of the monostable multivibrators of FIG. 3. Thus, the duration of time interval A—C corresponds directly to the duration of the output pulse or information bit provided by monostable multivibrator 126, and is variable in accordance with the setting of variable resistance 172 as determined by car controller C17S. In like manner, time interval C—E is representative of the timing period of monostable multivibrator 128, while time interval E—G is representative of the timing period of monostable multivibrator 130, as is time interval G—R for the timing period of monostable multivibrator 132. The remaining time intervals of the waveform of FIG. 4, although not specifically identified will, of course, correspond in duration to the respective timing periods set into the monostable multivibrators 134, 136, 138 and 140 through the use of the respective variable resistances 180, 182 and 186.

The time intervals A—B, C—D, E—F, G—Q, and on to H—I of the waveform of FIG. 4 correspond to the monostable multivibratorlike output provided by parallel to serial converter means 124 and are each of course, of approximately 200 μsec. in duration and represent the nonstable state of the said converter means. Thus, the Points A, C, E, G, R and on to H correspond to the trigger input pulses to converter means 124 as hereinabove described.

For use in the modulation of a carrier frequency to present an encoded carrier frequency envelope, the waveform of FIG. 4 is applied as one input to gate 90 of FIG. 2. Concomitantly, the 300 kHz. carrier frequency from oscillator 88 is of course being applied to the other input of the said gate. Accordingly, and as is believed well understood in this art, the carrier frequency will be gated or amplitude modulated by the output waveform of FIG. 4. Gate 90 will transmit the carrier frequency on its output line 46 when the input from parallel to serial converter means 124 is stable or at a nonzero level, while the carrier frequency output on line 46 will be suppressed when the converter means 124 are in the unstable or zero output state. This latter condition will be associated with the 200 μsec pulses generated by the converter means 124. The modulated carrier frequency output waveform of FIG. 5 will thus be transmitted from gate 90.

Figure 5:
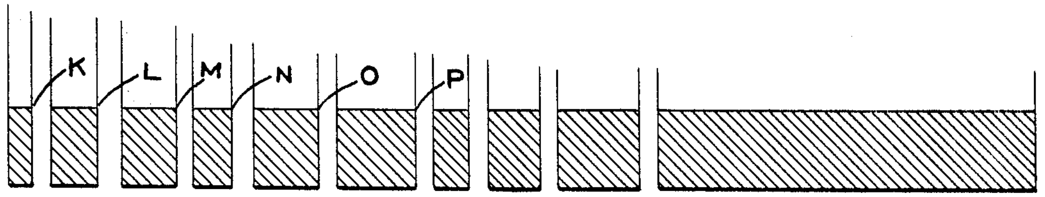
FIG. 5 illustrates a carrier frequency waveform as amplitude modulated by the control signal waveform of FIG. 4 for transmission from the system transmission means.

Since the respective waveforms of FIGS. 4 and 5 are drawn to the same time scale and commence form the same time reference point, comparison of FIGS. 4 and 5 will make clear the relationship therebetween.

More specifically, it may be noted that the modulated carrier frequency waveform of FIG. 5 will experience a readily discernable abrupt decrease in amplitude, as at points K, L, M, N, O and P coincident in point of time with the commencement of the unstable pulse output from the parallel to serial converter means 124 as indicated at A, C, E, G, R and H in FIG. 4. Thus, the carrier frequency waveform of FIG. 5 may be seen to be pulse modulated with the time duration between each of the said abrupt decreases in amplitude thereof, as indicated by the time intervals K—L, L—M, M—N, and N—O corresponding directly to the time intervals A—C, C—E, E—G and G—R of the waveform of FIG. 4.

Going one step further, and referring again to FIG. 3, it may thus be seen that time interval K—L corresponds in duration with the unstable state of monostable multivibrator 126 as was determined by the setting of variable resistance 172 in car controller C17S; time interval L—M corresponds in duration with the unstable state of monostable multivibrator 128 as was determined by the setting of variable resistance 174 in car controller C17V; time interval M—N corresponds in duration with the unstable state of monostable multivibrator 130 as was determined by the setting of variable resistance 176 in car controller C18S and time interval N—O corresponds in duration with the unstable state of monostable multivibrator 132 as was determined by the setting of variable resistance 178 in car controller C18V. The remaining time intervals of the pulse modulated carrier frequency waveform of FIG. 5 correspond in like manner with the unstable states of the remaining monostable multivibrators as determined by the respective settings of the variable resistances in the remaining car controllers. Thus, as an ultimate function of the control signal encoding or formulation means 86, a pulse modulated carrier frequency waveform is provided which contains time intervals information proportionally indicative of the respective settings of the respective variable resistances in the car controllers C17S and C17V through C20S and C20V.

This in turn will, or course, allow for the remote control of two proportional functions, i.e. steering and velocity, for each of cars C17, C18, C19 and C20, respectively, when this information is properly transmitted, received and decoded as described in detail hereinbelow.

In like manner, the respective outputs of each of the gates 66, 72, 78, 84, 90, 96, 102 and 108 of FIG. 2 will consist of the carrier frequency waveform of its associated carrier frequency oscillator as pulse modulated in accordance with the respective car controller settings of its associated car controller consoles.

All of these pulse modulated carrier frequency outputs are fed, as indicated by lines 38 through 52 to the control signal summing and preamplification means 110 wherein the same are summed, and the resulting carrier frequency envelope is then fed for amplification, as indicated by line 112, to the amplifier means 114. Therefrom, the amplified carrier frequency envelope is impedance matched with the transmission line antenna 56 for radiation therefrom.

The antenna configuration depicted in FIGS. 1 and 2 is, of course, designed for the control of model racing cars on the oval shaped track 58 and to confine the radiation pattern in the vicinity thereof. It is to be understood that a wide variety of other and different antenna configurations could be chosen depending upon the configuration of the area within which it is desired to exercise the control functions. It should also be clear that the control within the above configurations is not limited to model cars but may include any other devices desired to be controlled by this means.

The magnitude of the radiated field strength from the antenna 56 will vary as a function of the distance from the antenna wires. More specifically, and for an antenna 56 of the general dimensions as indicated in FIG. 1, the field strength is plotted by the curve of FIG. 9, and the radiated field may readily be seen therein to be generally confined to the area of the track 58. Thus, the field strength at point Y (FIG. 1) which is only 20 feet beyond one end of the track 58 has diminished to only approximately one tenth that of the minimum field strength within the track area. Further, at Point M (FIG. 1) which is 50 feet beyond the track end, the field strength is at least 100 times smaller than the minimum field strength within the track area. At even greater distances from the track area, it may be understood that the field strength decreases as the reciprocal of the distance cubed. By use of the depicted configuration of the antenna 56 for the model racing car control purposes as disclosed in detail herein, there may thus be seen to be provided a degree of field confinement which makes possible the disposition of a plurality of model racing car tracks 58 in very close proximity without control signal interaction or crosstalk. As depicted in graph form in FIG. 9, it should be understood that the field strength calculations assume matching of the transmitter and antenna impedances to prevent the reflection of standing waves back to the antenna and thus, insure signal phase matching. Further, these calculations can be considered valid with the depicted transmission line configuration only for lines which are shorter than one-eighth of the transmitted wavelength.

Referring again, to the field strength monitoring means 116 of the amplifier 114 of FIG. 2, and the related AGC means, it may be understood that the former detects the transmitted field strength and functions, in conjunction with the AGC means, to maintain at least the receiver and decoding means threshold field strength at the center of the radiated field area. This provides for adequate model racing car control throughout substantially the entire area of the track 58 with eight times the threshold field strength being provided on the race track area between the respective antenna transmission wires. The AGC means optimize the signal level to insure controllability and maximize the confinement of the radiated field. This is to say that the AGC means adjusts the gain of the amplifier 114 to insure that the 3db. contour of the radiated field is substantially confined to a relatively small distance beyond the confines of the track 58 which is again of particular significance to prevent one signal source from overriding another in applications wherein a plurality of the tracks 58 are disposed in close proximity.

Figures 6, 7, 8A, 8B, 8C, 8D, 8E, 8F, 8G, 8H:
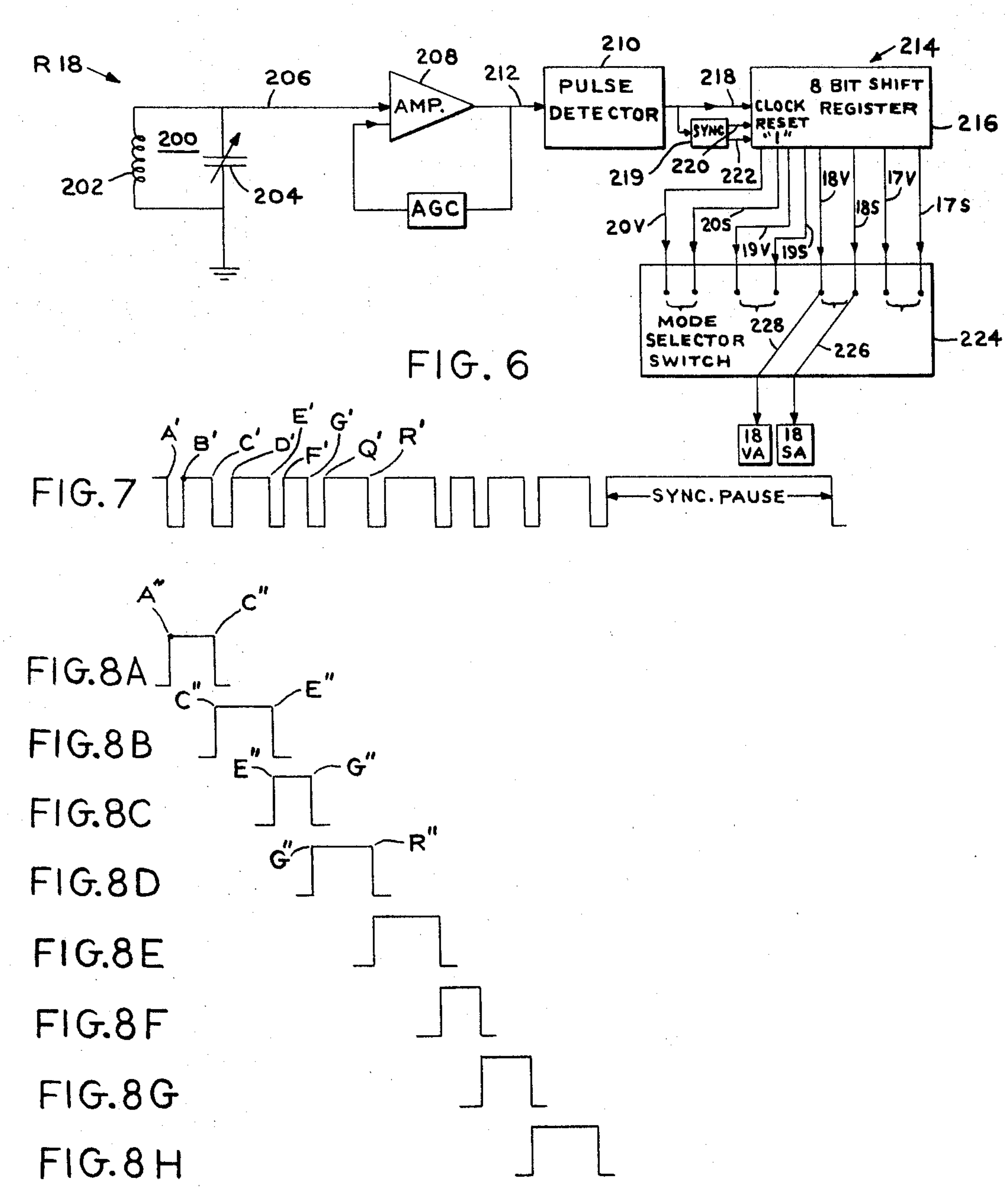
FIG. 6 is a block diagram illustrating one of the control signal receiving and decoding means of FIG. 1 in greater detail.
FIG. 7 illustrates the output waveform as provided by the control signal receiving means of FIG. 6 in response to the control signal modulated, carrier frequency waveform of FIG. 5.
FIG. 8A through 8H illustrates the parallel control signal waveforms provided by the decoding means of FIG. 6 in response to the output waveform of FIG. 7.

One of the model racing car control signal receiving and decoding means, in this instance receiving and decoding means R18, is depicted in greater detail in FIG. 6 and is tuned to be receptive only to a pulse modulated carrier frequency waveform of 300 kHz. in the nature of that depicted in FIG. 5. It is to be understood, however, that since the 300 kHz. pulse-modulated carrier waveform depicted in FIG. 5 functions to control four of the model racing cars, namely cars C17, C18, C19 and C20, the control signal receiving and decoding means R17, R19 and R20 will also be tuned to be receptive only to the 300 kHz. pulse-modulated carrier frequency waveform and will thus be of substantially identical circuit characteristics, differing only from R18 and each other in the chosen position of a four position mode selector switch as described in detail hereinbelow.

The control signal receiving and decoding means R18 include a loop antenna or LC tank circuit 200 which consists of parallel connected inductance 202 and variable capacitance 204 connected, as indicated by line 206, to amplifier 208 which in turn includes AGC means as indicated.

For use as disclosed herein, the loop antenna circuit 200 would have a loaded Q of 15 and the amplifier 208 an open loop gain of 1000. The AGC have a dynamic range of 1000 to indicate that a steady state signal can be maintained even at a signal strength increase of 1000. The loop antenna circuit 200 is designed to pick up approximately 2 volts of signal at a distance of a few inches from the transmitter antenna 58, and about 2 millivolts at the threshold transmitter field strength. It is to be understood that the above values are not critical but rather, were chosen for reasons of circuit design simplicity, and maximum noise rejection.

The AGC means of the receiver and decoding means R18 is of significant importance and functions to allow only the strongest signal which is present in the loop antenna circuit 200 to be amplified to an average voltage as determined by system design.

The loop antenna circuit 200 of the receiver and decoding means R18 is, of course, tuned to the 300 kHz. frequency of the oscillator 88 of encoding means 30 and, as set forth hereinabove, has a loaded Q of 15. As a result, the signal to noise ratio in the circuit will be at least 4 to 1 considering all of the other transmitted frequencies plus modulation sidebands. This signal to noise ratio rests on the assumption that all of the other transmitted frequencies are transmitted at the same power level, a condition which in this instance, is met by the design of the transmitter 20.

Pulse detector means are indicated at 210 and are connected from the amplifier 208 by line 211, whereby the 300 kHz. pulse modulated carrier frequency waveform of FIG. 5, received and amplified as described hereinabove, may be fed thereto. The pulse detector means 210 may take any suitable form and are, as utilized herein, designed to trigger at two-thirds of the AGC control voltage to thus insure that noise signals which are as great as one-fourth of the AGC means control voltage are not detected. Thus, is provided excellent noise rejection for the circuit.

Decoder means are indicated generally at 214 and comprise an 8-bit, serial to parallel digital shift register 216. The shift register includes a clock input on line 218, and a sync circuit 219 which is connected thereto as shown to determine the first pulse after the sync pause from the output of the pulse detector 210, as explained in detail hereinbelow, and provide a reset pulse to the shift register 216 on line 220, and provide the "1" input thereto on line 222.

The shift register 216 further includes eight outputs which for consistency of description, are identified as 17S, 17V, 18S, 18V, 19S, 19V, 20S and 20V, respectively. A four position, mode selector switch is indicated at 224 and each of the shift register outputs is connected thereto. The mode selector switch 224 includes two poles 226 and 228 for simultaneous connection to any correspondingly numbered pair to the shift register outputs. Actuator means for controlling respectively the steering and velocity of model racing car C18 are indicated at 18SA and 18VA and may take any form suitable for the performance of their respective control functions. Thus, for example, for the proportional control of the steering and velocity of a model racing car, each of the actuating means 18SA and 18VA could take the form of battery powered electric motors.

The reception of the 300 kHz. waveform of FIG. 5 by the loop antenna 200 will result in the amplification thereof by amplifier 208 since the former is tuned, through variation in the value of variable capacitor 204, to a frequency of 300 kHz. The thusly amplified waveform is then fed to the pulse detector means 210 which functions, in a manner opposite to that of the parallel to serial converter means 124 of the encoder 86 of FIG. 3, to strip the 300 kHz. carrier frequency therefrom and result in a pulse detector output waveform as depicted in FIG. 7 which is substantially the same as the parallel to serial converter means output waveform of FIG. 4. This is to say that the time intervals A'—C', C'—E', E'—G' and G'—R' and the remaining, not specifically identified time intervals the waveform of FIG. 7 are of the same duration as the time intervals A—C, C—E, E—G and G—R, and the remaining, not specifically identified time intervals of the waveform of FIG. 4. Thus, it may be understood whereby the time intervals or information bits determined by the manipulation of the respective car controllers C17S through C20S and C17V through C20V of the encoder 86 of FIG. 3 are transmitted to the control signal receiving and decoding means 18R of model racing car C18.

From the pulse detector means 210 the waveform of FIG. 7 is fed for decoding into the 8-bit, serial to parallel digital shift register 216. Although believed well understood in this art, the function of a serial to parallel shift register may be briefly noted to comprise the acceptance of pulses or information bits on a successive or serial basis and the subsequent read out thereof on a basis of parallel outputs.

Just prior to the introduction of the waveform of FIG. 7 to the shift register 216, the same will have been cleared and reset by the operation of the sync circuit 219 in response to the clock pulse following the sync pause of the preceding waveform. In addition, the sync circuit will determine that the pulse A′—B′ of FIG. 7 is the first pulse after the said sync pause and will accordingly insert this pulse into the shift resister 216 as a "1" input. As the succeeding pulses C′—D′, E′—F′, G′—Q′ arrive at the shift register 216, the "1" input will be shifted one position therein. This serial pulse input and shifting of the "1" input one position continues until all nine pulses of the pulse train of FIG. 7 have arrived at the shift register 216. At the completion of this, the "1" input has been shifted through all eight stages of the 8-bit shift register 214 and has completed the decoding sequence.

Thus, pulse or information bit A″—C″ of FIG. 8A, which corresponds in duration to time interval A′—C′ of FIG. 7 and to time interval A—C of FIG. 4, will be read out on line 17S; pulse or information bit C″—E″ of FIG. 8B, which corresponds in duration to time interval C′—E′ of FIG. 7 and time interval of C—E of FIG. 4, will be read out on line 17V; pulse or information bit E″—G″ of FIG. 8C, which corresponds in duration to time interval E′—G′ of FIG. 7 and to time interval E—G of FIG. 4 will be read out on line 18S; and pulse or information bit G″—R″ of FIG. 8D, which corresponds in duration to time interval G′—R′ of FIG. 7 and G—R of FIG. 4 will be read out on line 18V; with the remaining, not specifically identified pulses or information bits being read out on the remaining shift register outputs lines 19S, 19V, 20S and 20V, all as indicated in FIGS. 8A through 8H. With regard to FIGS. 8A through 8H it is of course, to be understood that the respective pulses or information bit thereof are depicted in staggered manner to make clear the relationship thereof to the respective pulses or information bits in FIG. 7.

As set forth hereinabove, however, each of the control signal receiving and decoding means 17R, 19R and 20R of model racing cars C17, C19 and C20 are also tuned to a frequency of 300 kHz. whereby this same pulse detector output waveform of FIG. 7 will also appear at the respective pulse detector outputs thereof, and these same pulses will appear at the respective shift register outputs thereof to make necessary in each instance a choice in each of the said control signal receiving and decoding means of the pair of pulses which is intended to control the respective steering and velocity of the particular model car in which the same is disposed. This is the function of the four position mode selector switch 224 which, as shown in FIG. 6, is positioned to connect the respective pulse or information bit outputs E—G and G—R on the respective steering and velocity actuators 18SA and 18VA.

In like manner, the four position mode selector switch in the control signal receiving and decoding means R17 of car C17 would be positioned to connect the respective shift register output lines thereof which correspond to lines 17S and 17V of shift registers 216 to transmit pulse or information bit outputs A—C and C—E to the respective steering and velocity actuators of car C17. Also, the respective mode selector switches in each of cars C19 and C20 would of course, be positioned to properly connect the respective shift register output lines thereof which correspond to lines 19S and 19V and 20S and 20V of shift register 216 to the respective steering and velocity actuators of cars C19 and C20.

OPERATION—FIGURE 1 FORM OF THE INVENTION

The overall operation of the system of the invention in the control of 32 model racing cars on a single track as illustrated in FIG. 1 will be briefly summarized.

Prior to the commencement or participation for sport or pleasure of a model car race, each of the 32 participants or any fewer participants as desired is given control of a car controller console and is positioned with a clear view of the model racing car track 58. In addition, the mode selector switches in each of the 32 cars are properly set so that each car of a group of four cars which is controlled by any encoder will be exclusively responsive to a different pair of steering and velocity control signals, and the respective loop antenna circuits in each of the four cars of each group are adjusted, if necessary, through adjustment of the respective loop antenna circuit variable capacitors, to insure that the said circuits will be receptive to the carrier frequency of the said encoder.

With all necessary adjustments, if any, made, the 32 model car racing cars are properly arranged on the track 58 in starting positions and the race commenced by the supply of power to the system from any convenient source.

Each participant will have complete and exclusive control of the steering and velocity of his particular model racing car and will manipulate the respective car controllers to best advantage in and attempt to have his model racing car finish the race first.

Of particular advantage is the fact, as set in great detail hereinabove with reference to FIG. 1 and 9, that the radiated field or signal strength drops off very markedly within a relatively short distance form the confines of the model racing car track 58. Thus, a plurality of the said tracks could be operatively installed indoors in relatively close proximity to each other without fear of control signal interference or "crosstalk."

As a result, maximum utilization of available building area, with maximum profit, could be expected from a commercial venture in the nature of a hobby center wherein could be operated a plurality of relatively closely spaced model racing car tracks.

Too, the significant versatility of the system bears specific mention in that it is believed clear that the simple repositioning of the mode selector switches in any four model racing car group will be effective to render the said model racing cars controllable from different ones of the car controller consoles of the relevant encoder. Too, although of necessity a somewhat more involved procedure, it may be understood that proper adjustment of the variable capacitor in the control signal receiving and decoding means of any model racing car will suffice to render the latter receptive only to control signals transmitted by a different carrier frequency. Thus, it may fairly be said that, as disclosed, any of the model racing cars of the system as depicted in FIG. 1 may, through adjustment, be rendered controllable through manipulation of the car controllers of any of the depicted car controller consoles.

FIGURE 10 FORM OF THE INVENTION

Figures 9, 10:
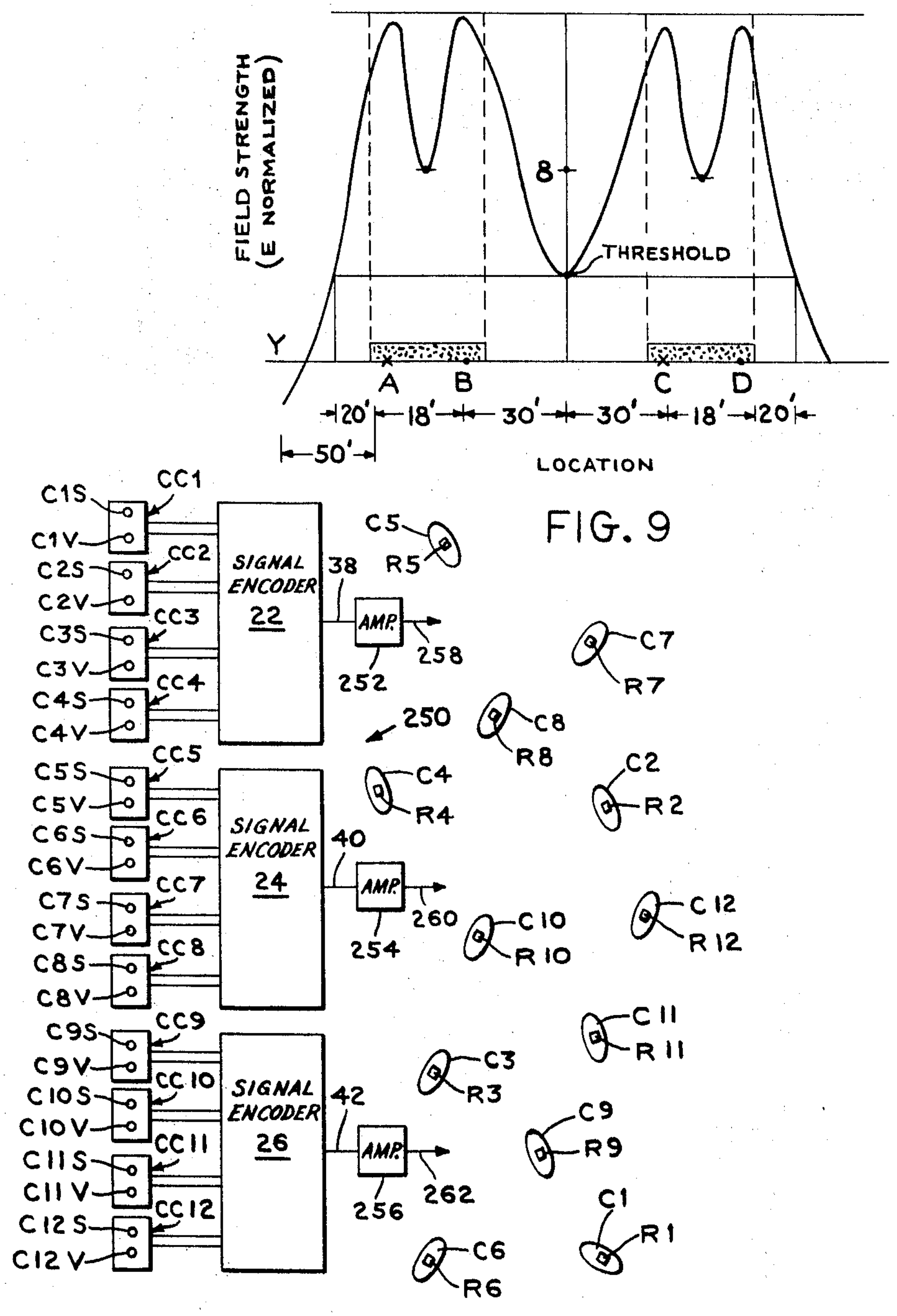
FIG. 9 is a graph illustrating control signal field strength vs. location on and around the confined area, model car track of FIG. 1.
FIG. 10 illustrates a somewhat modified form of the system of the invention which utilized higher control signal transmission frequencies and does not rely upon a confined, effective control signal transmission area.

Referring now to the embodiment of my invention as indicated generally at 250 in FIG. 10, the same may be understood to be very similar in fabrication and manner of operation to the system embodiment 20 of FIG. 1 whereby the same reference characters are utilized in the latter FIG. to identify the same system components.

The primary difference of the latter embodiment resides in the fact that higher transmission frequencies are utilized therein with the result that although the range of car controllability will be significantly enhanced the advantage of confined field signal radiation, is, of course, lost.

As depicted in FIG. 10, the system embodiment 250 comprises only three control signal encoding or formulation means, as indicated at 22, 24 and 26, but it is to be understood that this is for purposes of simplification of illustration and description, only, since the basic principle of system operation have already been described in great detail hereinabove, and that the system embodiment 250, can, as can the system embodiment of FIG. 1, comprise a greater or lesser number of control signal encoding or formulation means than that depicted.

In the manner of the embodiment of FIG. 1, the respective control signal encoding or formulation means 22, 24 and 26 again each comprise four car controller consoles operatively connected thereto and the latter each comprise two readily manipulatable car controllers operatively disposed thereon.

In the embodiment 250, separate amplifier means are provided for each control signal encoding or formulation means. Thus, control signal encoding or formulation means 22 are connected to amplifier means 252, control signal encoding or formulation means 24 are connected to amplifier means 254 and control signal encoding or formulation means 26 are connected to amplifier means 256.

Since confinement of the radiated signal is not to be achieved in the system embodiment 250, single radiator-type antennas which will of course radiate the respective pulse modulated carrier frequencies therefrom in all directions may be utilized. Thus, a single radiator antenna 258 is connected to amplifier means 252, a single radiator antenna 260 is connected to amplifier means 254 and a single radiator antenna 262 is connected to amplifier 256.

Twelve model cars are indicated at C1 through C12 and each includes therein a control signal receiving and decoding means as indicated at R1 through R12. Since there is no radiated field confinement in this instance, the respective cars C1 through C12 are depicted in random manner and might for example, be disposed on a large outdoor field and controlled through manipulation of the respective relevant car controllers simply for practice. Alternatively, the said cars could of course the disposed on a track in the nature found surrounding most high school athletic fields and controlled for racing as described hereinabove. Too, since the control signals will be radiated in all directions from the respective antennas 258, 260 and 262 it is to be understood that all or any of the car need not be disposed as depicted to the same side of the system 250 but could be disposed for effective control at any location within the effective control signal transmission range of the said system.

Of particular advantage with regard to the system 250 is the fact that the same makes possible the expansion of the existing higher frequencies now allotted by the F.C.C. for radio control by a factor of at least four while still providing for dual function, proportional control for each radio controlled car. This is to say that each allotted frequency can be utilized to proportionally control at least eight separate car control functions. Alternatively, if only one control function were to be performed per car, it may be understood that each allotted frequency could be utilized to control at least eight cars.

Although as disclosed hereinabove, the system of our invention is directed to the control of a plurality of model cars, it is believed clear that the said system is equally applicable for the performance of a very wide range of other control functions which would include, for example, the control of model boats, model airplanes, or the control of a broad range of devices or equipment which are utilized throughout the entire industrial complex. Too, with suitable modification of the respective control signal encoding or formulation means to render the same effective to formulate the control signal waveforms in response to voice or data inputs rather than for manipulation of a car controller, and with suitable modification of the respective control signal receiving and decoding means to render the same effective to audibly or otherwise reproduce the information transmitted thereto, it may be understood whereby the control system of our invention would provide an excellent communications system. This would, of course, be particularly applicable in areas wherein the available information transmission frequencies, as assigned, by the F.C.C., are severely overburdened.

Further, it is believed clear that more or less than eight control signals could be transmitted on each carrier frequency through suitable encoder and shift register modification.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What We claim is:

1. In a remote control system for controlling a plurality of independent functions for at least one remotely disposed device, a. a plurality of independent control means to provide a signal to vary proportionately the operation of each respective remote function on said device associated with a given one of said plurality of independent control means, b. signal formulation and encoding means including, means generating at least one carrier frequency, means for generating a train of nonuniformly spaced pulses each proportioned to a setting of a respective one of said plurality of control means, and means to modulate each carrier frequency with said train of nonuniformly spaced pulses and to convert said train of nonuniformly spaced pulses from parallel to serial form, c. means to transmit each modulated carrier frequency by radiating means at a prescribed level of field intensity, d. means to substantially confine and automatically control the effective field strength of each transmitted carrier frequency, e. at least one of said remote devices having a first means to selectively receive and demodulate the carrier frequency associated with said remote device, f. at least one other remote device having a second means to selectively receive and demodulate the carrier frequency associated with said other remote device, g. first means cooperatively associated with said first receiver and demodulation means to receive said serial form of nonuniformly spaced pulses and provide in time coincidence said nonuniformly spaced pulses to parallel outputs thereon, i. an independent plurality of signal selection means each selectively connectable to the parallel outputs on the respective first means and second means to permit each of said signal selection means to select a predetermined on of said nonuniformly spaced pulses for utilization to actuate means for performing the h. second means cooperatively associated with said second receiver and demodulation means to receive said serial form of nonuniformly spaced pulses and provide in time coincidence said nonuniformly spaced pulses to parallel outputs thereon, function associated with said one of the plurality of control means determining the duration of said predetermined nonuniformly spaced pulses selected.

2. In a remote control system as claimed in claim 1 wherein said signal formulation and encoding means comprises a plurality of timing means and means to convert each one of said plurality of timing means to an associated one of said plurality of control means to continuously vary the operation of said timing device whereby said timing means will provide a pulse spaced proportional in duration to the setting of the association control means.

3. In a remote control system as claimed in claim 1 wherein said plurality of timing means comprises monostable multivibrators, and the control means in circuit with an associate multivibrator includes variable resistance means to provide for adjusting the operation of the associate one of the monostable vibrators.

4. In a remote control system as claimed in claim 1 wherein said first and second means to receive said serial form of nonuniformly spaced pulses and provide the same to parallel outputs such respectively include shift register means having a single input and parallel outputs.

5. In a remote control system as claimed in claim 1 wherein the total number of shift register parallel outputs are equal to the number of control means in said system.

6. In a remote control system as claimed in claim 5 wherein the independent signal selection means each include switch means selectively connectable to at least one of said parallel outputs on a shift register means.

7. In a remote control system as claimed in claim 5 wherein the means to modulate each carrier frequency comprises gate means to generate the carrier frequency and an input connected to the means to generating the train of nonuniformly spaced pulses.

8. In a remote control system as claimed in claim 1 wherein the respective means to selectively receive and demodulate the carrier frequency associated with the remote devices comprises adjustable frequency selective circuit means tuned to the carrier frequency, and demodulation means to strip the nonuniformly spaced pulses from said carrier frequency to provide the same in serial form.

9. In a remote control system as claimed in claim 8 wherein the respective means to selectively receive and demodulate the carrier frequency associated with the remote devices comprises an amplifier means cooperatively associated with each adjustable frequency selective circuit means, and automatic gain control means cooperatively associated with each amplifier means and operative to prevent amplification of each carrier frequency to more than the predetermined field strength of said frequency selective circuit.

10. In a remote control system as claimed in claim 8, wherein; said means to transmit the modulated carrier frequency comprises a loop type antenna, and radiated field strength sensing and control means cooperatively with said loop antenna to substantially confine and automatically control the effective field strength of the modulated carrier frequency to within the confines of said loop antenna means at a prescribed level of intensity.

11. In a remote control system for the control of a plurality of toys in the nature of racing cars on a model racing car track wherein each of said model racing cars has a plurality of independent functions to be operated thereon.

a. a plurality of independent control means remote from said cars operable to provide a signal to vary proportionately the operation of each respective remote function on said cars associated with a given one of said plurality of independent control means, b. signal formulation and encoding means including means to generate at least one carrier frequency, means for generating a train of nonuniformly spaced pulses each proportional to a setting of a respective one of said plurality of control means, and means to modulate each carrier frequency with said train of nonuniformly spaced pulses and to convert said train of nonuniformly spaced pulses from parallel to serial form, c. means to transmit each modulated carrier frequency by radiating means at a prescribed level of field intensity in the form of a loop antenna means adjacent the periphery of said model car racing track, d. radiated field strength sensing and control means cooperatively associated with said loop antenna means to substantially confine and automatically control the effective field strength of each modulated carrier frequency to within the confines of said model car racing track of a prescribed level of intensity, e. at least two of said model racing cars having means to selectively receive and demodulate the carrier frequency to provide said nonuniformly spaced pulses in serial form.

g. at least one signal selection means in one of said at least two model racing cars operative to select at least one of said nonuniformly spaced pulses for continuously variable operation of one of the functions of said model racing car, h. at least one other signal selection means in at least one of said at least two different model racing cars operative to select at least a predetermined different one of said uniformly spaced pulses for continuously variable operation of one of the functions of the associated model racing car, i. said signal selection means in each of said model racing cars operatively associated with the means to selectively receive and demodulate the carrier frequency in the model racing car whereby the operation of the function will be proportional to that of the signal of the associated control means.